United States Patent [19]
DeBlock et al.

[11] Patent Number: 5,655,339
[45] Date of Patent: Aug. 12, 1997

[54] TUBULAR SKYLIGHT WITH IMPROVED DOME

[75] Inventors: David A. DeBlock, Holland; Gwen H. Kramer, Charlevoix; Ronald L. Sitzema, Jr., Ellsworth, all of Mich.

[73] Assignee: ODL, Incorporated, Zeeland, Mich.

[21] Appl. No.: 694,558

[22] Filed: Aug. 9, 1996

[51] Int. Cl.⁶ .......................... E04D 13/03; G02B 17/00
[52] U.S. Cl. .......................... 52/200; 359/591
[58] Field of Search .................. 52/200, 80.1, 82, 52/3, 107; 359/591, 592, 593, 597, 598

[56] References Cited

U.S. PATENT DOCUMENTS

| | | |
|---|---|---|
| 729,660 | 6/1903 | Poulson. |
| 1,156,251 | 10/1915 | Shuman ...................... 52/200 X |
| 1,254,520 | 1/1918 | Macduff. |
| 2,740,903 | 4/1956 | Willcox. |
| 2,858,734 | 11/1958 | Boyd ......................... 52/200 |
| 2,947,267 | 8/1960 | Stark ......................... 359/593 X |
| 3,511,559 | 5/1970 | Foster. |
| 3,905,352 | 9/1975 | Jahn. |
| 4,114,186 | 9/1978 | Dominguez. |
| 4,198,953 | 4/1980 | Power. |
| 4,246,477 | 1/1981 | Latter. |
| 4,280,480 | 7/1981 | Raposo. |
| 4,306,769 | 12/1981 | Martinet. |
| 4,329,021 | 5/1982 | Bennett et al.. |
| 4,351,588 | 9/1982 | Zullig. |
| 4,395,581 | 7/1983 | Girard. |
| 4,436,373 | 3/1984 | Kirsch. |
| 4,496,787 | 1/1985 | Touchais et al.. |
| 4,519,675 | 5/1985 | Baryonah. |
| 4,559,925 | 12/1985 | Snow. |
| 4,589,400 | 5/1986 | Mori. |
| 4,593,976 | 6/1986 | Eijadi et al.. |
| 4,620,771 | 11/1986 | Dominguez. |
| 4,696,554 | 9/1987 | Seawright. |
| 4,761,716 | 8/1988 | Mori. |
| 4,839,781 | 6/1989 | Barnes et al. ................ 362/299 |
| 4,855,886 | 8/1989 | Eijkelenboom et al.. |
| 4,883,340 | 11/1989 | Dominguez. |
| 4,915,093 | 4/1990 | Mori et al.. |
| 4,928,666 | 5/1990 | Mori et al.. |
| 5,027,566 | 7/1991 | Gilowski. |
| 5,099,622 | 3/1992 | Sutton ......................... 52/200 |
| 5,175,967 | 1/1993 | Greenwood. |
| 5,204,777 | 4/1993 | Curshod. |
| 5,291,331 | 3/1994 | Miano et al.. |
| 5,293,305 | 3/1994 | Koster. |
| 5,408,795 | 4/1995 | Eljadi et al.. |
| 5,467,564 | 11/1995 | DeKeyser et al.. |
| 5,493,824 | 2/1996 | Webster et al.. |
| 5,502,935 | 4/1996 | Demmer. |

Primary Examiner—Robert Canfield
Attorney, Agent, or Firm—Warner Norcross & Judd

[57] ABSTRACT

A tubular skylight having an improved dome improving the efficiency of the skylight. The dome includes an integral prism in a portion of its outer surface to reflect light downwardly through the skylight. The dome is hemispherical, and the prism includes a plurality of grooves extending along great circles that pass through the apex of the dome. The prism covers only an angular segment of the hemispherical dome; and the grooves stop short of the apex of the dome.

17 Claims, 3 Drawing Sheets

TUBULAR SKYLIGHT WITH IMPROVED DOME

BACKGROUND OF THE INVENTION

The present invention relates to skylights, and more particularly to tubular skylights, which include a reflective tube extending downwardly from the dome.

Tubular skylights have acquired increasing popularity as a means of introducing natural light into a building interior. These skylights include a dome mounted on the building roof, a light diffuser mounted in the building ceiling, and a reflective tube interconnecting the dome and the diffuser. Natural light entering the skylight through the dome reflects downwardly through the tube to the diffuser. The tube in a sense acts as a gigantic optical fiber. Typically, the domes are fabricated of acrylic; and the tube is fabricated of reflective aluminum. A tubular skylight of this type is sold by ODL, Incorporated, the assignee of the present invention, under the trademark EZ LIGHT.

The efficiency of such skylights (i.e. the amount of natural light reaching the building interior) is primarily a function of the amount of light passing through the dome into the tube and of the reflective efficiency of the tube. It is desirable to channel or steer as much light as possible downwardly through the tube to illuminate the building interior. One such approach includes positioning a reflector inside the dome above the roof to reflect light downwardly into the tube. A tubular skylight of this type is illustrated in U.S. Pat. No. 5,099,622, issued Mar. 31, 1992, to Sutton, and entitled "Skylight." However, this approach is relatively complex structurally, relatively expensive, and aesthetically deficient. Further, the reflector may actually decrease the performance of the skylight when no direct sunlight is present, because the reflector blocks a portion of the ambient light.

SUMMARY OF THE INVENTION

The aforementioned problems are overcome in the present invention wherein the dome of a tubular skylight includes an exterior surface having a prismatic portion to reflect light downwardly into the tube. Preferably, the prismatic portion is located on the northern portion of the dome. Consequently, sunlight entering the southern portion, and to a lesser extent the eastern and western portions, of the dome at relatively low angles is reflected by the prismatic surface downwardly into the tube.

In the disclosed embodiment, the dome is hemispherical including a base and an apex. The prismatic surface includes a plurality of vertical grooves each extending between the base and the apex along great circles passing through the apex. The grooves begin at the base and terminate short of the apex. Further preferably, the grooves are located in an angular segment of the hemispherical dome.

The prismatic surface increases the amount of light directed or steered downwardly through the tube. The enhancement is most notable when the sun is relatively low in the sky as in the morning, the late afternoon and evening, and during the winter months. The dome also increases both the portion of the day and the number of seasons during which the skylight provides effective interior lighting.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
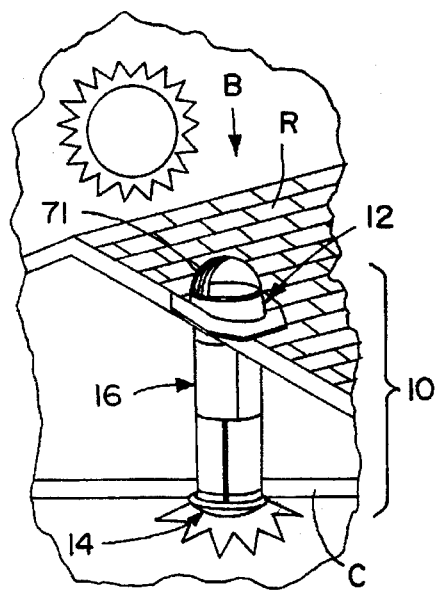
FIG. 1 is a perspective view showing a tubular skylight having the dome of the present invention mounted within a building.
Figure 2:
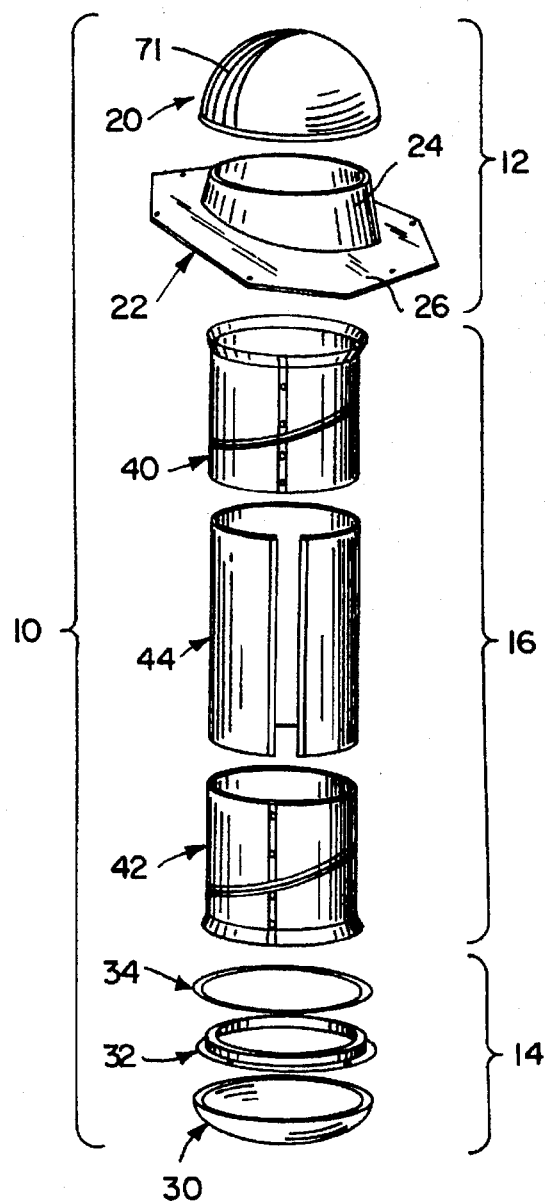
FIG. 2 is a perspective exploded view of the tubular skylight.

A tubular skylight constructed in accordance with a preferred embodiment of the invention is illustrated in FIGS. 1 and 2 and generally designated 10. As perhaps most clearly illustrated in FIG. 2, the skylight includes a dome assembly 12, a diffuser assembly 14, and a tube assembly 16 interconnecting the dome and diffuser assemblies. The skylight 10 is installed in a building B having roof R and ceiling C. More particularly, the dome assembly 12 is mounted within the roof R; and the diffuser assembly 14 is mounted within the ceiling C. The tubular assembly 16 extends between the dome assembly 12 and the diffuser assembly 14 to channel light from the dome to the diffuser. With the exception of the dome, the skylight 10 is generally well known to those skilled in the art.

The dome assembly 12 includes a dome 20 and a roof flashing 22. The dome 20, which is new, will be described in greater detail below. The flashing 22 mounts within a building roof R to provide a structural support for the dome 20. The roof flashing 20 includes a curb 24 and an integral flashing flange 26 extending therefrom. The roof flashing 22 is available in a variety of constructions to accommodate shingle roofs, tile roofs, and other selected applications.

The diffuser assembly 14 includes a diffuser 30, a ceiling trim ring 32, and a tube/ring seal 34. The diffuser 30 is a prismatic light diffuser. The ceiling trim ring 32 supports the diffuser 30 within the ceiling C. The tube/ring seal 34 fits about the tube assembly 16 as will be described and provides a mechanical interlock between the tube assembly and the diffuser assembly 14.

The tube assembly includes upper and lower adjustable tubes 40 and 42, respectively, and an interconnecting adjustable tube 44. The upper adjustable tube 40 fits within the roof flashing 22, and the lower adjustable tube 42 connects to the diffuser assembly 14 by way of the tube/ring seal 34 as will be described. The adjustable tube 44 telescopically interfits with both of the adjustable tubes to accommodate a variety of heights of the roof R above the ceiling C. Additional adjustable tubes 44 can be used as necessary to accommodate unusual heights between the roof and the ceiling.

Again, as thus far described, the tubular skylight components are conventional and generally well known to those in the relevant art. The novelty of the present invention resides in the dome 20 to be described hereinafter.

Figure 3:
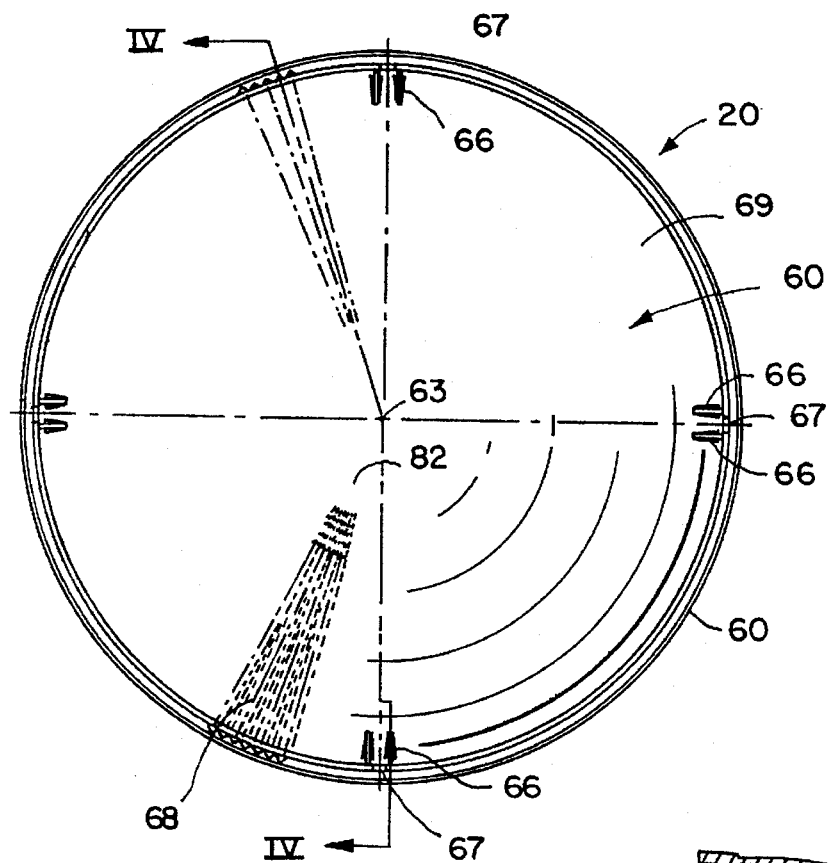
FIG. 3 is a top plan view of the dome.
Figure 4:
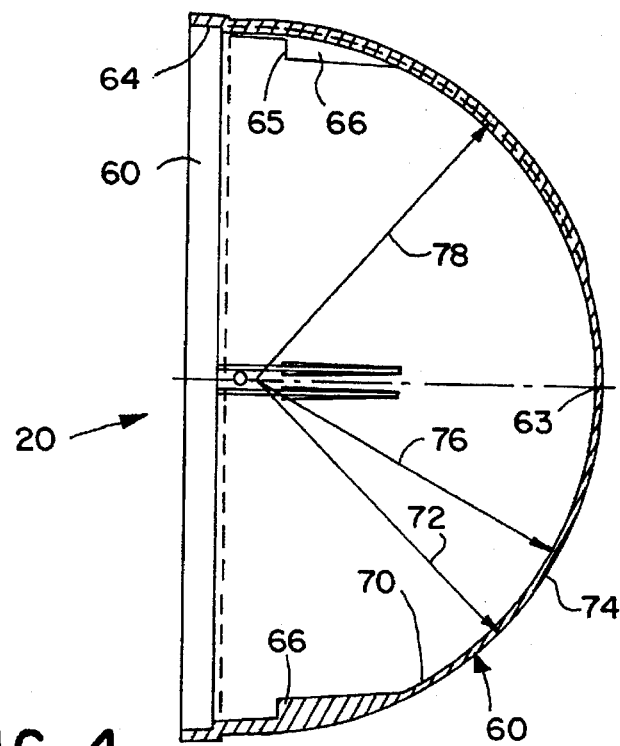
FIG. 4 is a sectional view of the dome taken along line IV—IV in FIG. 3.

The dome 20 is illustrated most clearly in FIGS. 3 and 4. The dome includes a circular base 60 and a generally hemispherical portion 62 extending upwardly therefrom and reaching an apex 63. The base 60 includes steps 64 and 65 that fit over and receive the stepped curb 24 of the roof flashing 22 (see FIG. 2). The second step 65 rests on the top of the curb and is defined by four pairs of fingers 66 located at 90° intervals around the circumference of the base 60. Holes 67 are provided to receive fasteners to secure the dome to the curb.

The generally hemispherical dome portion 60 includes an interior surface 70 and an exterior surface 72. The exterior surface includes a prismatic surface or portion 68 and a nonprismatic surface or portion 69. The prismatic portion is illustrated perhaps most clearly in FIG. 3 and includes the patterned surface covering somewhat less than the left half of the dome in a pattern as described below. The interior surface 70 has a radius 72, and the exterior surface 74 has a radius 76 in the nonprismatic portion and a radius 78 in the prismatic portion. The radius 76 is slightly greater than the radius 78. The nonprismatic portion 69 is generally uniform in thickness between the inner surface 70 and the exterior surface 74. The dome portion 60 has an increased thickness in the prismatic portion 68. Because the prismatic surface is uneven (i.e. grooved) the distance between the interior surface and the exterior surface varies. The minimum thickness in the prismatic portion 68 is approximately equal to the thickness in the nonprismatic portion 69, and the maximum thickness in the prismatic portion is approximately twice the thickness in the nonprismatic portion.

The shape and configuration of the prismatic portion 68 is perhaps best illustrated in FIG. 3. The prismatic portion 68 includes a plurality of grooves 71 that molded, cut, or otherwise formed in the exterior surface 74. Each of the grooves 71 extends along a great circle passing through the apex 63. Each of the grooves 71 extends from the base 64 to a location short of the apex 63. In the preferred embodiment, 37 first grooves 71 are formed at 4° intervals, and 38 second grooves 71 are formed at 4° intervals offset 2° from the first set of grooves so that each first groove is bracketed by a pair of second grooves. As currently contemplated, the grooves 71 are formed by molding; however, other forming techniques, such as cutting, can be used.

The exterior angle between the walls of a groove 71 when using the preferred material is preferably in the range of 86° to 94°, with the most preferred angle being 92°. The groove angles may change with other materials depending on their indices of refraction. The angle is selected so that direct light from the dome interior is reflected by the internal reflection of the prism—not refracted—as it strikes the interior side of the groove walls. The structure and effect of the described technique is disclosed in U.S. Pat. No. 4,839,781, issued Jun. 13, 1989 to Barnes et al, and entitled "Reflector/Refractor."

The prismatic portion 68 comprises an angular segment of the hemispherical dome. In the preferred embodiment, this segment is approximately 148° of the 360° circumference. The grooves 71 stopping short of the apex leaves a pie-shaped portion 82 surrounding the apex of the dome that is part of the nonprismatic portion 69 of the exterior surface.

The entire dome 20 is fabricated of a single piece of acrylic. The currently preferred material is that sold under the designation V825UVA-5A by Rohm & Haas. For a dome 10 inches in diameter, the dome portion 60 is 0.114 inch thick in the nonprismatic portion and up to 0.204 inch thick in the prismatic portion. Other materials suitable for skylight domes may be used and include polycarbonates and nylons. Other materials may be used if they provide the light transmittance and strength characteristics required in skylight domes.

The particular pattern of the prism will depend on the performance desired and the anticipated location of the skylight. The illustrated dome has been designed for use at 40° latitude as representative of a "normal" U.S. location. The pattern follows the highest path of the sun, which of course occurs during the summer.

Figure 5:
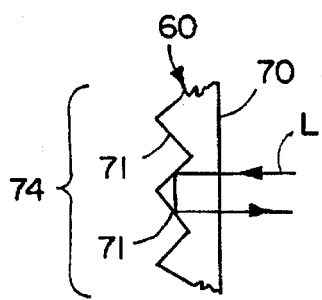
FIG. 5 is a fragmentary sectional view of the prismatic portion of the dome showing the grooves in the exterior surface.

The light reflectance provided by the prismatic portion 68 is perhaps best illustrated in FIG. 5. Each of the grooves 71 provides two apparent reflective surfaces to light rays striking the surfaces from inside the dome because of the high index of refraction. Consequently, light impinging on the grooves 71 from the interior of the dome are reflected back into the interior of the dome.

Turning specifically to FIG. 5, a light ray L from the interior of the dome passes through the interior surface 70, then reflects off the surfaces of two grooves 71 to be returned to the dome interior. Consequently, light at low angles which would pass directly through the dome is instead reflected back into the dome interior.

The prismatic portion 68 does not significantly block ambient light from passing through the dome. Therefore, the dome does not significantly reduce the amount of ambient light; and the dome does not decrease the amount of direct light passing into the skylight. The only losses (approximately 8% in the preferred material) are due to the material from which the dome is fabricated.

Assembly and Operation

The tubular skylight 10 is installed within a building in conventional fashion. Vertically aligned holes are cut in the roof R and the ceiling C. The roof flashing 22 is installed in the roof. The upper adjustable tube 40 is fitted within the curb 24 of the roof flashing 22 and slid downwardly until the upper edges of both are aligned. The dome 20 is fitted over the curb 24 (with the upper adjustable tube 40 fitted therein) and secured in position using screws (not shown).

The ceiling trim ring 32 is secured to the underside of the ceiling C. The tube/ring seal 34 is placed over the lower adjustable tube 42, and the assembly is pushed into the ceiling trim ring from above the ceiling C. The extension tube 44 is then slid as necessary to a connecting position between the upper and lower adjustable tubes 40 and 42. All seams are taped with duct tape. Finally, the diffuser 30 is installed within the trim ring 32 using a partial-turn coupling.

Figure 6:
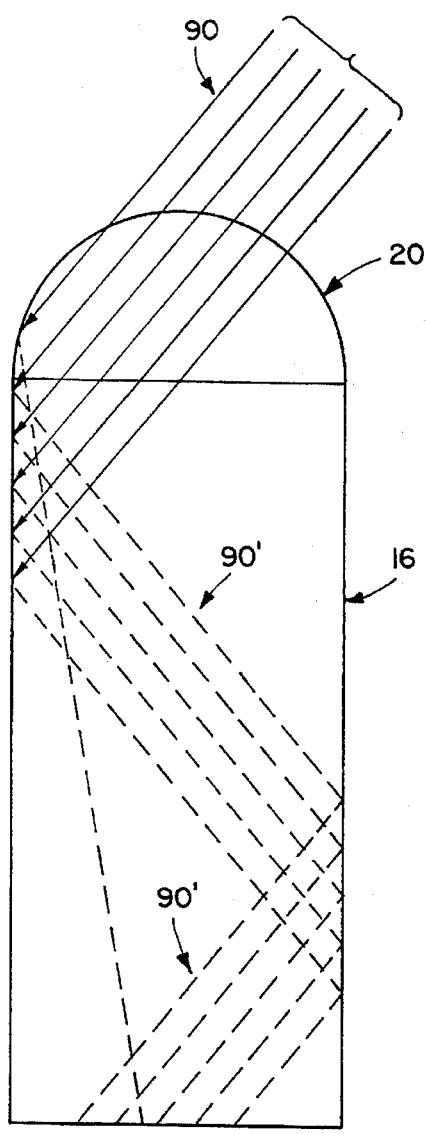
FIG. 6 is a schematic illustration of noon-day sun rays at the vernal and autumnal equinoxes.
Figure 7:
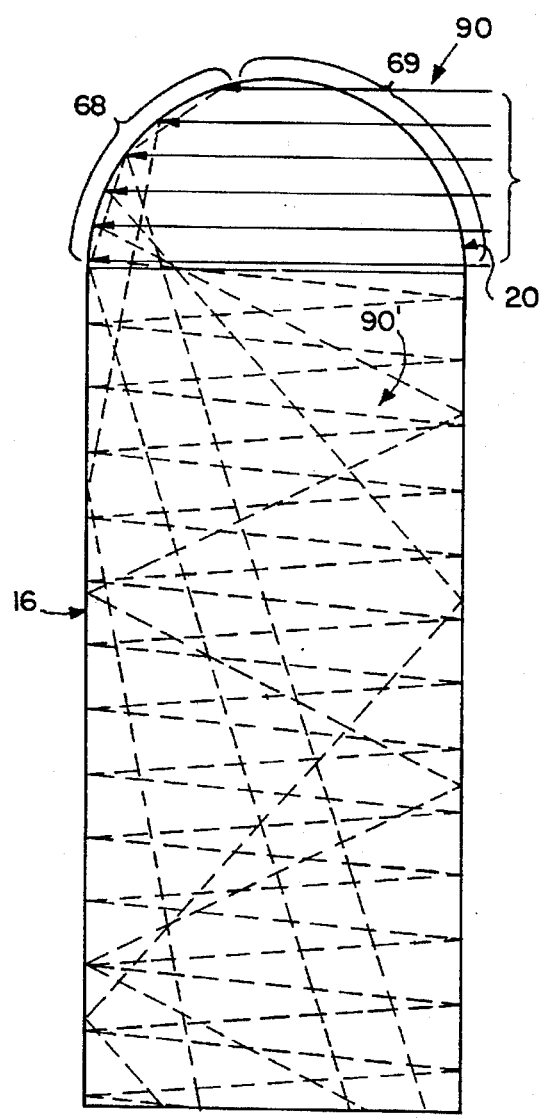
FIG. 7 is a schematic illustration of morning sun rays at the vernal and autumnal equinoxes.

FIGS. 6 and 7 illustrate the functional performance of the new dome 20. Turning first to FIG. 6, the dome 20 and tube assembly 16 are schematically illustrated. Direct light rays 90 are shown entering the skylight at a 50° angle from the horizontal, which is the angle of the sun at 40° latitude and 98° longitude on the vernal and autumnal equinoxes. When the sun is at this angle, virtually all of the direct rays 90 pass through the nonprismatic portion of the dome 20 to enter the skylight 10 in conventional fashion. The reflected rays 90' are illustrated in dotted lines and illustrate how the light is reflected downwardly through the skylight assembly.

FIG. 7 illustrates the performance of the skylight dome when the sun is relatively low in the sky. Specifically, the direct sunlight rays 90 arrive at the skylight dome basically on the horizontal. The direct rays 90 pass directly through the nonprismatic portion 69. Without the prismatic portion 68 of the present invention, the direct rays 90 would continue to pass through the skylight dome so that none of those rays would pass downwardly into the tube. Instead, the prismatic portion 68 reflects the direct rays 90 downwardly through the dome at a variety of angles. The reflected rays 90' are illustrated as dashed lines and pass downwardly at a variety of reflected angles.

The object of the present invention is to direct light downwardly through the tube at virtually any angle on the premise that all of the downwardly directed light enhances, even in some small fashion, the light exiting the bottom of the tube. Additionally, as can be seen, some of the rays pass directly through the tube without further reflection off the tube wall to the bottom of the tube assembly 16.

The present invention greatly enhances the performance of the tubular skylight by directing or steering a larger percentage of the available light downwardly through the tube. The prismatic portion 68 enhances the performance of the skylight tube particularly when the sun is relatively low in the sky as occurs in the morning, the late afternoon, and the winter.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An improved tubular skylight including a dome to be mounted on a roof, a light diffuser to be mounted on a ceiling, and a reflective tube extending between the dome and the light diffuser, wherein the improvement comprises said dome comprising:

a generally hemispherical body having an apex, an interior surface, and an exterior surface, said interior surface being generally smooth, said exterior surface including a generally smooth portion and a prismatic portion, said prismatic portion being an angular section of said dome, said prismatic portion including a plurality of vertical grooves extending along great circles of said hemispherical body passing through said apex.

2. An improved tubular skylight as defined in claim 1 wherein said smooth portion of said exterior surface includes a circular area of non-zero radius centered on said apex.

3. A skylight dome assembly comprising:

a flashing to be mounted on a roof; and a skylight dome to be mounted on said flashing, said dome having an interior surface and an exterior surface, said exterior surface including a prismatic portion.

4. A skylight dome assembly as defined in claim 3 wherein:

said dome includes a base and an apex above said base; and said prismatic portion including a plurality of grooves located between said base and said apex.

5. A skylight dome assembly as defined in claim 4 wherein:

said dome is generally hemispherical and said base is generally circular;

said grooves extend along great circles of said dome passing through said apex.

6. A skylight dome assembly as defined in claim 5 wherein said prismatic portion comprises an angular segment of said dome.

7. A skylight dome assembly as defined in claim 6 wherein said grooves stop short of said apex.

8. A skylight dome assembly as defined in claim 4 wherein said prismatic portion comprises an angular segment of said dome.

9. A skylight dome assembly as defined in claim 3 wherein said prismatic portion is entirely outside of a circle surrounding said apex.

10. A skylight dome comprising a body having a base and a dome portion extending above said base, said dome portion including an apex, an interior surface, and an exterior surface, said exterior surface defining a prismatic portion, said prismatic portion defining a plurality of grooves between said base and said apex along said dome portion.

11. A skylight dome as defined in claim 10 wherein:

said base is generally circular and said dome portion is generally hemispherical.

12. A skylight dome as defined in claim 11 wherein said grooves extend along great circles of said dome portion passing through said apex.

13. A skylight dome as defined in claim 12 wherein said prismatic portion is an angular sector of said dome portion.

14. A skylight dome as defined in claim 13 wherein said grooves stop short of said apex.

15. A skylight dome as defined in claim 10 wherein said prismatic portion is an angular sector of said dome portion.

16. A skylight dome as defined in claim 15 wherein said grooves stop short of said apex.

17. A skylight dome as defined in claim 10 wherein said grooves stop short of said apex.

* * * * *